Nov. 6, 1956  W. P. NIBLICK  2,769,264
PENDANT VIBRATORY DISPLAY DEVICE
Filed Sept. 24, 1953
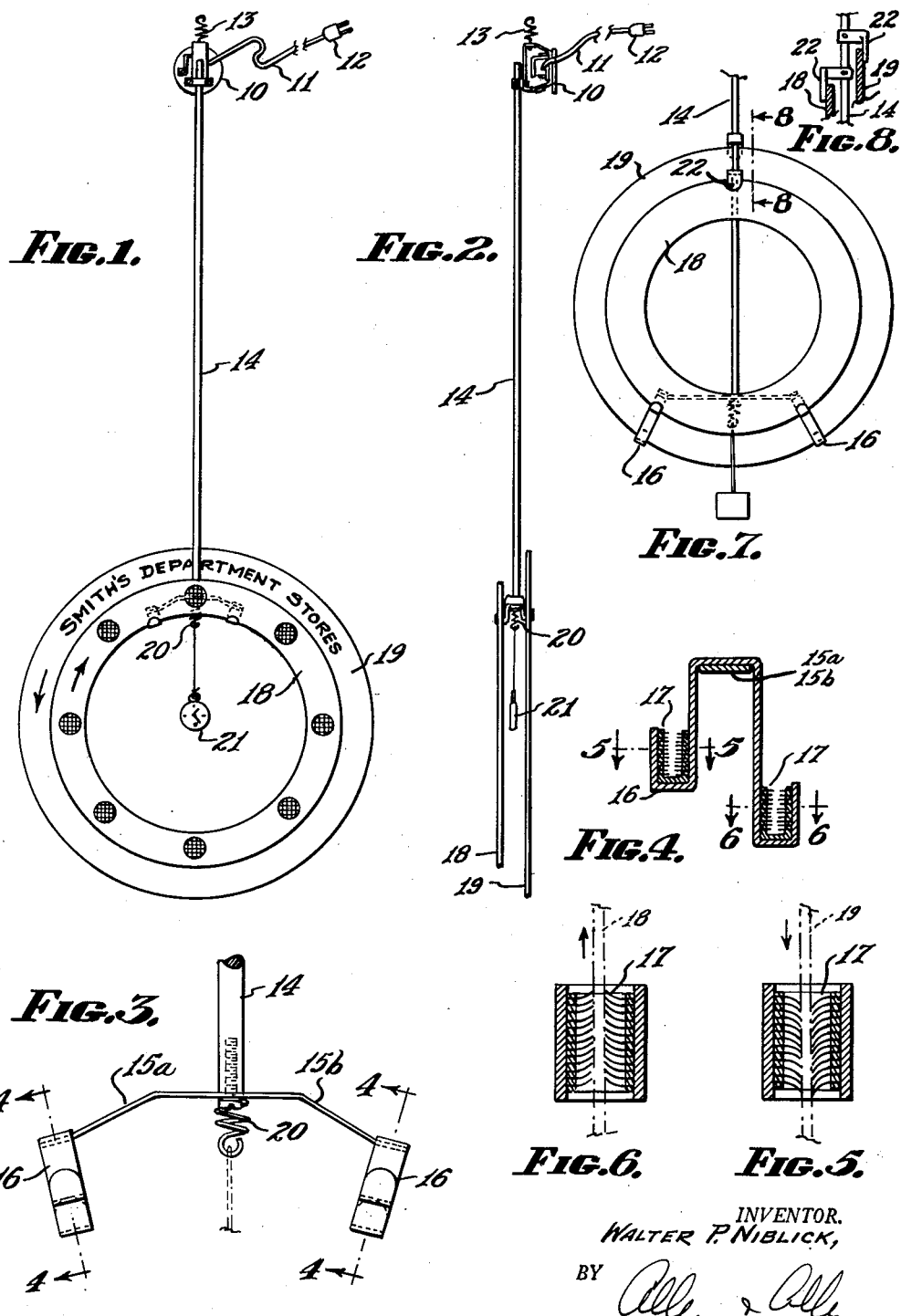
INVENTOR.
WALTER P. NIBLICK,
BY
ATTORNEYS.

United States Patent Office 2,769,264
Patented Nov. 6, 1956

2,769,264

PENDANT VIBRATORY DISPLAY DEVICE

Walter P. Niblick, Cincinnati, Ohio

Application September 24, 1953, Serial No. 382,129

14 Claims. (Cl. 40—139)

This invention relates to a pendant vibratory display device. In recent years there has been a great demand for action displays of all sorts for use in connection with the display for advertising of various kinds of merchandise in store windows.

It is an object of the present invention to provide a display which will be a pendant display rather than a standing display and which will demand attention from passers-by because of the very novelty of a moving pendant display.

It is another object of my invention to provide a display which will hang by means of a slender transparent plastic rod or the like and which will support one or more rings or annuli which will rotate at various speeds and different directions.

These and other objects of the invention which I shall point out in greater detail hereinafter or which will be apparent to one skilled in the art upon reading these specifications, I accomplish by that certain construction and arrangement of parts of which I shall now disclose an exemplary embodiment.

Reference is made to the drawings forming a part hereof and in which:

Figure 1 is a front elevational view of the device according to the invention.

Figure 2 is a side elevational view of the same.

Figure 3 is an enlarged fragmentary front elevational view of the lower end of the vibration transmitting element showing the ring supporting brackets.

Figure 4 is a cross sectional view on an enlarged scale taken on the line 4—4 of Figure 3.

Figure 5 is a cross sectional view on an enlarged scale taken on the line 5—5 of Figure 4.

Figure 6 is a cross sectional view taken on the line 6—6 of Figure 4.

Figure 7 is a fragmentary view similar to Figure 1 of a modification; and

Figure 8 is a fragmentary enlarged cross sectional view taken on the line 8—8 of Figure 7.

Briefly, in the practice of my invention I provide a vibration generating device and suspended by resilient means such as a spring. Operatively secured to the vibration generating device and depending therefrom, I provide a slender elongated vibration transmitting element, to the end of which a pair of arms is asymmetrically secured. Each arm bears one or more brackets of U-shaped cross section for supporting a ring and each bracket is lined with a material having a unidirectional nap. Each ring is supported by two brackets and the ring is in contact with the nap of the lining material. The nap in the two brackets which support a single ring is disposed in the same direction so that when vibration is transmitted through the vibration transmitting element, the ring is caused to revolve.

Other brackets may be arrnaged with the nap extending in the opposite direction so that a ring supported thereby will rotate in the opposite direction. By adjustment of the moment arm of the brackets, different speeds of rotation may be attained.

Referring now to the drawings, I have indicated at 10 a vibration generating element. This element may be of the type disclosed in my patent, No. 2,289,381 dated July 14, 1942, or it may be of any other suitable type. When the element 10 is connected to a source of electrical energy, as by means of the cord 11 and plug 12, an armature is caused to vibrate.

The member 10 is suspended from a hook or the like by means of a spring 13. A vibration transmitting element 14 is operatively secured to the device 10 in such manner that vibration of the armature thereof is transmitted along the member 14.

As seen in Figure 3, a pair of arms (which may be made from a single strip of material or the like), indicated at 15a and 15b, are secured to the lower end of the element 14 and each arm carries a bracket structure indicated generally at 16 and more clearly shown in Figure 4.

As seen in Figure 4, there is provided on either side of the arm 15a and the arm 15b a bracket of U-shaped cross section. Each bracket is lined with a material 17 having a unidirectional nap. It will be observed that one of the brackets has a relaively short moment arm and the other a relatively long moment arm.

As seen in Figures 5 and 6, the nap of the lining 17 in one of the brackets extends in one direction while the nap of the lining in the other bracket extends in the opposite direction.

A pair of annuli or rings of cardboard, plastic, or similar like material and indicated at 18 and 19, are provided, one of them being supported by the two brackets on one side of the arms 15a, 15b and the other supported by two brackets on the other side of the arms 15a, 15b.

As seen in Figure 1, the larger annulus 19 is supported in the brackets having the shorter moment arms while the annulus 18 is supported in the brackets having the longer moment arms. The larger or outer annulus 19 will therefore revolve at a slower speed than the inner annulus 18. Preferably the outer slower moving annulus 19 will carry an advertising message and will be arranged to revolve in a counterclockwise direction so that the message can be read easily. The smaller annulus 18 will then preferably rotate in the opposite direction and at a higher speed and will carry a decorative pattern which may be multicolor and will serve primarily to attract attention.

In Figures 1, 2 and 3, I have shown a spring 20 secured to the lower end of the member 14 from which an article of merchandise 21 may be suspended so as to occupy a position in the center of the display.

While the material of the element 14 is not a limitation upon the invention, I prefer to employ a rod of clear and transparent plastic so that an element of mystery is added as to the manner in which the annuli are caused to rotate. It will be understood that the device 10 will preferably be concealed by a valance or the like.

In Figures 7 and 8 I have shown a modification of the invention wherein the rings 18 and 19, instead of hanging from the brackets 16, rest on the brackets 16. In this embodiment it is necessary to provide means to prevent the annuli from tipping and these may take the form of guide fingers 22 of Figures 7 and 8. They may be secured in any desired manner to the member 14.

It will be observed from a careful consideration of Figures 3 and 7, that the arms 15a, 15b are asymmetrical. The arm 15a is shown as being slightly longer than the arm 15b and being bent at a slightly more obtuse angle. The desired effect can be achieved either by making one arm longer than the other or by a difference in angularity of the two arms or both. The asymmetrical arrangement of arms, and therefore of the brackets, produces a more pronounced and steady movement of the rings. The difference in speed of rotation of the two rings is due to the difference in moment arm of the brackets on one side of the arms 15a, 15b and those on the other side of the arms 15a, 15b. The difference in direction of rotation is simply function of the direction of the nap of the lining material in the brackets.

It will be understood that numerous modifications may be made without departing from the spirit of my invention and I therefore do not intend to limit myself except as set forth in the claims which follow.

Having now fully described my invention, what I claim as new and desire to secure by Letters Patent is:

1. In a device of the class described, resilient suspension means, a vibration generating device suspended thereby, an elongated vibration transmitting element operatively connected to said generating device and depending therefrom, a pair of arms asymmetrically secured to the lower end of said transmitting element, a bracket of U-shaped cross section secured to each of said arms, each said bracket having a lining of material having a unidirectional nap, the lining in said brackets being disposed with the nap extending in the same direction, and a relatively thin annulus supported in said brackets in contact with said lining, whereby upon operation of said vibration generating device, said annulus is caused to revolve.

2. A device according to claim 1, wherein the axes of said brackets are toed-in downwardly, and said annulus hangs in said brackets.

3. A device according to claim 1, wherein the axes of said brackets are toed-in upwardly, and said annulus rests on said brackets, and means are provided to prevent said annulus from tipping over.

4. A device according to claim 1, wherein mutually opposed pairs of brackets of U-shaped cross section are secured to each of said arms, wherein the lining of one of each pair of brackets has its nap extending in one direction and the lining of the other of each pair of brackets has its nap extending in the opposite direction, and wherein a relatively thin annulus is supported in one of each pair of said brackets, and a second relatively thin annulus is supported in the other of each pair of brackets, said annuli being in contact with the lining of the respective brackets, whereby upon operation of said vibration generating device, said annuli are caused to revolve in opposite directions.

5. A device according to claim 4, wherein the moment arms of the brackets supporting one annulus differ from the moment arms of the brackets supporting the other annulus, whereby said annuli revolve at different speeds.

6. A device according to claim 5, wherein the annuli are of different diameters and wherein the brackets supporting the larger annulus have the shorter moment arms, whereby the larger annulus revolves at a slower speed than the smaller annulus.

7. A device according to claim 6, wherein said larger annulus carries a message and rotates in a counterclockwise direction.

8. A device according to claim 1, wherein the axes of said brackets are toed-in upwardly, wherein said annulus rests on said brackets, wherein means are provided to prevent said annulus from tipping over, wherein mutually opposed pairs of brackets of U-shaped cross section are secured to each of said arms, wherein the lining of one of each pair of brackets has its nap extending in one direction and the lining of the other of each pair of brackets has its nap extending in the opposite direction, and wherein a relatively thin annulus is supported in one of each pair of said brackets, and a second relatively thin annulus is supported in the other of each pair of brackets, said annuli being in contact with the lining of the respective brackets, whereby upon operation of said vibration generating device, said annuli are caused to revolve in opposite directions.

9. A device according to claim 8, wherein the moment arms of the brackets supporting one annulus differ from the moment arms of the brackets supporting the other annulus, whereby said annuli revolve at different speeds.

10. A device according to claim 9, wherein the annuli are of different diameters and wherein the brackets supporting the larger annulus have the shorter moment arms, whereby the larger annulus revolves at a slower speed than the smaller annulus.

11. A device according to claim 10, wherein said larger annulus carries a message and rotates in a counterclockwise direction.

12. A device according to claim 1, wherein the asymmetrical character of said arms is based on a difference in length of said arms.

13. A device according to claim 1, wherein the asymmetrical character of said arms is based on a different angularity of said arms.

14. A device according to claim 1, wherein the asymmetrical character of said arms is based partly on a difference in length and partly on a difference in angularity of said arms.

References Cited in the file of this patent

UNITED STATES PATENTS

| 1,617,126 | Kurten | Feb. 8, 1928 |
| 2,063,687 | Lefrand | Dec. 8, 1936 |

FOREIGN PATENTS

| 486,330 | Germany | Nov. 13, 1929 |